United States Patent [19]

Pearson

[11] Patent Number: 4,663,239

[45] Date of Patent: May 5, 1987

[54] FIRE RETARDANT COMPOSITION

[76] Inventor: Glenn A. Pearson, 3834 Mount Vernon Ave., Alexandria, Va. 22305

[21] Appl. No.: 827,629

[22] Filed: Feb. 10, 1986

[51] Int. Cl.$^4$ ............................................. B32B 27/42
[52] U.S. Cl. ................ 428/524; 106/18.15; 106/18.16; 106/18.21; 252/610; 428/528; 428/530; 428/921; 524/597; 524/843; 525/498; 525/515; 528/230; 528/259; 528/269
[58] Field of Search ............ 106/18.15, 18.16, 18.21; 524/597, 843; 528/230, 259, 269; 252/610; 428/524, 528, 530, 921; 525/498, 515

[56] References Cited

U.S. PATENT DOCUMENTS

| | | | |
|---|---|---|---|
| 3,883,462 | 5/1975 | Pearson | 524/843 |
| 3,939,107 | 2/1976 | Brown | 428/528 X |
| 3,983,269 | 9/1976 | Pearson | 427/370 |
| 3,984,367 | 10/1976 | Pearson | 524/843 |
| 3,990,977 | 11/1976 | Pearson | 252/602 |
| 4,119,598 | 10/1978 | Pearson | 524/711 |
| 4,215,172 | 7/1980 | Pearson | 428/264 |
| 4,239,542 | 12/1980 | Kinoshita et al. | 106/18.15 X |
| 4,370,442 | 1/1983 | Pearson | 524/598 |
| 4,419,401 | 12/1983 | Pearson | 428/262 |
| 4,427,745 | 1/1984 | Pearson | 428/524 |
| 4,435,533 | 3/1984 | Tsolis et al. | 106/18.15 X |
| 4,468,495 | 8/1984 | Pearson | 428/530 X |
| 4,552,803 | 11/1985 | Pearson | 428/262 |

Primary Examiner—Lucille M. Phynes
Attorney, Agent, or Firm—Lowe, Price, LeBlanc, Becker & Shur

[57] ABSTRACT

A fire retardant composition in a stable liquid form comprises the reaction product of an aqueous aldehyde, preferably formaldehyde, solution, at least one alcohol solvent, an alkanolamine, an organic catalyst, ammonium hydroxide, urea and an aqueous phosphoric acid solution. The aldehyde and urea are included in an approximately 1:1 weight ratio. A method of forming the reaction product comprises adding urea to a mixture of aldehyde, alcohol, alkanolamine, organic catalyst and ammonium hydroxide, and heating the resultant mixture to at least 150° F.

19 Claims, No Drawings

FIRE RETARDANT COMPOSITION

FIELD OF THE INVENTION

The present invention relates to a fire retardant composition in a stable liquid form. More particularly, the fire retardant composition comprises a reaction product of an aqueous aldehyde, at least one alcohol solvent, an alkanolamine, urea and an aqueous phosphoric acid solution. The fire retardant composition may be coated on or impregnated in various flammable materials in order to render them fire proof.

BACKGROUND OF THE INVENTION

Various urea/formaldehyde compositions are well known in the art for use in numerous applications. Moreover, various modifications to such compositions have been disclosed including the co-reaction of the formaldehyde and urea with triethanolamine. Further modifications have provided formaldehyde-urea compositions which are water soluble. Such compositions are disclosed in my prior U.S. Pat. Nos. 3,883,462; 3,983,269; 3,984,367; 3,990,977; 4,119,598; 4,215,172 and 4,370,442.

However, previously known urea-formaldehyde compositions are disadvantageous in that these compositions release unacceptably high levels of formaldehyde when used as a coating or impregnating material. For example, when used as a coating on or impregnating agent in a wood panel in order to impart fire retardant properties, known urea-formaldehyde compositions release amounts of formaldehyde which are maximum safe levels. Such high formaldehyde emission levels are a health hazard.

Thus, there is a need to provide a fire retardant composition including aldehydes such as formaldehyde and urea which is stable in the liquid state over extended periods of time and which does not emit high levels of formaldehyde when used as a coating or impregnating material.

SUMMARY OF THE INVENTION

It is accordingly a primary object of the present invention to provide a fire retardant composition which includes an aldehyde such as formaldehyde and urea and which may be safely used as a coating material or impregnating agent. It is another object of the invention to provide a fire retardant composition including formaldehyde and urea which does not emit unacceptably high levels of formaldehyde. It is a further object to provide a fire retardant composition in a stable liquid form which may be used as a coating material or impregnating agent as is, mixed with water or in combination with a thermosetting resin. It is a further object of the present invention to provide a fire retardant composition which is compatible with various additives, thereby permitting modification of the composition to meet the requirements of various diverse applications. These and other objects of the present invention will be more readily apparent from the following detailed description.

In satisfaction of the foregoing objects and advantages, the present invention provides a fire retardant composition comprising the reaction product of, in parts by weight, about 45-75 parts of an aqueous aldehyde solution, preferably formaldehyde, about 25-45 parts of at least one alcohol solvent, about 5 to 20 parts of an alkanolamine, about 2-10 parts of an organic catalyst, about 5-15 parts ammonium hydroxide, about 15-30 parts urea, about 2-10 parts ammonium chloride, about 45-75 parts of an aqueous phosphoric acid solution and about 2-10 parts ammonium formate. The aldehyde and urea are included in an approximately 1:1 weight ratio. The fire retardant solution is particularly suitable as a coating material or impregnating composition for flammable materials such as wood, paper and textiles.

DETAILED DESCRIPTION

The fire retardant composition of the present invention is provided in a stable liquid solution form and comprises the reaction product of a number of important components. Specifically, the composition comprises the reaction product of an aqueous aldehyde solution, at least one alcohol solvent, an alkanolamine, an organic catalyst, ammonium hydroxide, urea, ammonium chloride, an aqueous phosphoric acid solution and ammonium formate. The composition may further include additional fire retardant materials known in the art. Additionally, the aldehyde and urea are included in approximately 1:1 weight ratio.

The aqueous aldehyde solution may comprise any aldehyde known in the art, for example a simple aldehyde such as formaldehyde, acetaldehyde, paraldehyde or glyoxal, or other mono-, di- or polyaldehydes. In addition, any substance yielding or acting as an aldehyde may be used. In a preferred embodiment, formaldehyde is employed, particularly in the convenient commercially available 37 wt.% aqueous solution form. About 45 to 75 parts by weight of the aqueous aldehyde solution is used in forming the reaction product which comprises the fire retardant composition of the present invention. If the 37 wt.% formaldehyde solution is used, about 60 parts by weight are preferred.

The alcohol solvent is used in an amount of about 25 to 45 parts by weight in forming the reaction product and may comprise any of the alcohols well known in the art. For example, the alcohols may comprise ethyl alcohol, isopropyl alcohol, methylalcohol, various alkylene glycols, mono- and dialkyl ethers of ethylene glycol, and mixtures thereof. Preferably, the alcohol solvent comprises a mixture of solvents, for example 25-35 parts ethyl alcohol and 2-10 parts ethylene glycol. The ethylene glycol also serves as a stablizing agent for the reaction product.

An alkanolamine is also included in the formation of the reaction product in an amount of about 5-20 parts by weight. The preferred alkanolamine includes 1-4 carbon atoms in the alkyl group, and more preferably comprises mono-, di- or triethanolamine or mixtures thereof. Triethanolamine is commercially available as a 98% solution.

About 2-10 parts of an organic catalyst and about 5-15 parts ammonium hydroxide are further included in the formation of the reaction product which comprises the fire retardant composition of the present invention. The organic catalyst may be any well known in the art which promotes the reaction of an aldehyde compound such as formaldehyde. A preferred organic catalyst comprises p-toluene sulfonic acid used in amounts of about 5 parts by weight.

Urea is included in the formation of the reaction product in an approximately 1:1 weight ratio, about 15-30 parts by weight. While urea, $CO(NH_2)_2$, is the preferred compound, other ureas such as thiourea, ethylene urea, dimethylol ethylene urea, dimethylol propylene urea, dimethyol dihydroxy ethylene urea or other substituted ureas may be employed. When a 37% aqueous formaldehyde solution is included in about 60 parts by weight, it is preferred that 22 parts by weight urea are used. This high amount of urea contributes to the prevention of formaldehyde emission when the resultant reaction product is used as a fire retardant coating material or impregnating agent. Moreover, the reaction product is formed so that the fire retardant composition comprises a stable liquid solution.

Ammonium chloride is also included in the formation of the reaction product and serves as both a catalyst and a fire retardant. The ammonium chloride is included in about 2–10 parts and most preferably in powder form in about 6 parts by weight. An aqueous phosphoric acid solution is also included and serves as an additional firre retardant. An 85% by weight phosphoric acid solution is available commercially and may be included in the formation of the reaction product of the present invention in an amount of about 45–75 parts by weight. In combination with the above recited preferred embodiments, the 85% aqueous phosphoric acid solution is included in a preferred amount of about 60 parts by weight. Finally, about 2–10 parts by weight ammonium formate are included in the formation of the reaction product. The ammonium formate serves as a reducing agent and also improves the drying properties of the fire retardant composition when it is used as a coating material or impregnating agent.

The fire retardant composition may further include additional additives well known in the art. For example, additional fire retardant compounds may be included such as oxides, hydroxides, nitrates, sulfates, phosphates and chlorides of aluminum, zinc, tin and antimony and various ammonium salts. Additional fire retardants are preferably included in an amount of about 1–5 parts by weight. A preferred additive comprises 2 parts by weight zinc nitrate.

Thus, a preferred embodiment of the fire retardant composition of the present invention comprises the reaction product of 45–75 parts of a 37% aqueous formaldehyde solution, 25–35 parts ethyl alcohol, 2–10 parts ethylene glycol, 5–20 parts triethanolamine, 2–10 parts p-toluene sulfonic acid, 5–15 parts ammonium hydroxide, 15–30 parts urea, 2–10 parts ammonium chloride, 45–75 parts of an 85% aqueous phosphoric acid solution, 2–10 parts ammonium formate and 1–5 parts zinc nitrate.

The method according to the present invention for forming the fire retardant composition is important in providing a stable liquid solution. In the past, when formaldehyde and urea have been used in a 1:1 weight ratio, an unstable composition is formed which quickly hardens into a non-usable form. However, according to the method of the present invention, a liquid solution is provided which is stable for extended amounts of time of at least several months and thus is advantageous for commercial production. According to the method of the invention, the aqueous aldehyde solution, alcohol solvents, alkanolamine and organic catalysts are mixed together and stirred vigorously. The ammonium hydroxide is added in order to raise the pH of the mixture from about 7 or 8 to approximately 10–12. The organic catalyst initiates reaction of the aldehyde, alkanolamine and ammonium hydroxide.

Subsequently, urea is added to the mixture in an amount which provides a 1:1 weight ratio with the aldehyde. In the past, such a high content of urea was not practical since it would cause the reaction product to harden shortly after formation. However, according to the method of the present invention, the mixture to which urea has been added is heated up to a temperature of at least about 150° F. The mixture is maintained at this temperature for at least 10 minutes in order to stabilize the mixture and prevent the reaction product from hardening. While the mixture is still hot, the ammonium chloride is added and promotes further reaction of the urea, aldehyde and alkanolamine. The ammonium chloride also serves as a fire retardant compound in the final reaction product.

The mixture is then cooled to about 100° F. and additives such as additional fire retardants may then be added. In a preferred embodiment, zinc nitrate is added which also acts as a catalyst in promoting reactions of the aforementioned compounds. The aqueous phosphoric acid solution is then added which causes an exothermic reaction and rapidly raises the temperature to about 120°–150° F. The mixture is then cooled to about 100° before the addition of the ammonium formate in order to prevent gelling of the mixture when the ammonium formate is added. The resultant product is a clear stable liquid solution which may be used in a number of applications to provide fire retardant properties.

The liquid composition may be applied to various materials to provide a clear, nonstaining, moisture resistant coating. When applied to flexible substrates, the dried composition remains flexible. The composition also provides excellent fire retardant properties, resists smoldering and releases little or no aldehydes when dried.

More particularly, the fire retardant composition of the present invention may be used as a coating material on flammable materials such as wood, paper and textiles. In a preferred embodiment, the composition is used in full strength as a coating for wood panels in order to render the panels fire retardant. Similarly, the composition may be used full strength as an impregnating agent for particle board, paper and the like. Heat and pressure are applied to an impregnated board or other impregnated material in order to provide a final product. The composition also has adhesive properties and may be employed as an adhesive in veneer laminates, multi-layer paper products and the like. When used on wood panels and the like, the composition of the present invention may serve as a base for additional paint coatings or, alternatively, may be incorporated into and serve as a base for a paint composition. In accordance with an important feature of the present invention, when used in these manners the dried composition emits no or a very low level of the aldehyde component, for example formaldehyde. Thus, the fire retardant composition of the present invention does not constitute a health hazard.

The fire retardant composition may also be mixed with water to form an aqueous solution for coating or impregnating various flammable materials. For example, 5–90 parts by weight of the fire retardant reaction product set forth above may be mixed with 10–95 parts by weight water to form an aqueous solution suitable for coating or impregnating textile materials in order to render the same fire retardant. In a preferred embodiment, 10–15 parts by weight of the fire retardant reaction product set forth above is mixed with 85–90 parts by weight water to form a composition suitable for coating or impregnating textile fabrics comprising for example cotton or synthetic fibers. The fire retardant reaction product is soluble in water. However, once the composition is coated on or impregnated in a fabric material and dried, the composition is durable and is not removed by repeated washings.

In accordance with another feature of the invention, the fire retardant reaction product of the present invention may be combined with a thermosetting resin such as a melamine resin or a phenol resin and heated to produce a more durable coating or impregnate. For example, 70-95 parts by weight of the fire retardant reaction product may be combined with 5-30 parts by weight of the thermosetting resin and heated to a curing temperature to provide a thermoset coating or impregnate. The resultant cross linking provides a durable tough film.

The composition of the present invention is also compatible with other catalyzing agents, other fire proofing agents, fillers, pigments, lubricants and the like which are well known in the art. Having described the invention in general terms, a preferred embodiment of the invention is set forth below. In the example and through the specification, parts are by weight unless otherwise specified.

EXAMPLE 1

A fire retardant composition according to the present invention was formed as follows:

60 grams of a 37% aqueous formaldehyde solution ware mixed with 30 grams denatured ethyl alcohol, 5 grams ethylene glycol, 10 grams triethanolamine and 5 grams p-toluene sulfonic acid and the resultant mixture was stirred vigorously. Eight grams of ammonium hydroxide were added in order to raise the pH of the solution from about 7 to between 10 and 12. 22 grams of urea were then added, the resultant mixture being stirred well and then heated to a temperature of about 150° F. for between 10-15 minutes. While the solution was still hot, 6 grams of ammonium chloride powder were added and the solution was then cooled to about 100° F. and 2 grams of zinc nitrate were added. 60 grams of an 85% aqueous phosphoric acid solution were then added causing an exothermic reaction and raising the temperature of the solution to about 150° F. The solution was again cooled to about 100° F. and 5 grams of ammonium formate were added. The resultant solution comprised a clear liquid which was stable for an extended period of time of at least several months.

EXAMPLE 2

The composition of Example 1 was used to coat various ¼" fir plywood samples in order to determine the levels of formaldehyde emissions. Specifically, Sample A contained no coating, Sample B included a coating comprising 100% of the fire retardant composition of Example 1, Sample C included a coating comprising 90% of the fire retardant composition of Example 1 and 10% of a phenol resin, and Sample D included a coating comprising 90% of the fire retardant composition of Example 1 and 10% of a melamine resin comprising CYMEL 405 manufactured by American Cyanamide. The samples with unsealed edges were subjected to a first 2 hour desiccator test and 7 days later to a second 2 hour desiccator test in order to measure the levels of formaldehyde released. The results of these tests were as follows:

| Sample | Formaldehyde Release, 1st Test PPM | Formaldehyde Release, 2nd Test PPM |
| --- | --- | --- |
| A - no coating | .052 | .052 |
| B - 100% Example 1 composition | .260 | .104 |
| C - 90% Example 1 composition 10% Phenol resin | .208 | .111 |
| D - 90% Example 1 composition 10% Melamine resin | .397 | .176 |

These results demonstrate that the fire retardant composition according to the present invention provides very little release of formaldehyde and is well below the 1 ppm level currently regarded as safe by the U.S. Environmental Protection Agency. Moreover, the coatings are clear, non-staining, resistant to moisture and do not turn white after aging. The coatings also provide the plywood samples with a fire retardant film which does not burn and resists smoldering.

The invention has been set forth herein with reference to certain preferred embodiments. However, as obvious variations will become apparent to those skilled in the art, the invention is not considered to be limited to the preferred embodiments set forth.

What is claimed is:

1. A fire retardant composition in a stable liquid solution form, comprising the reaction product of, in parts by weight, (a) about 45-75 parts of an aqueous aldehyde solution, (b) about 25-45 parts of at least one alcohol solvent, (c) about 5 to 20 parts of an alkanolamine, (d) about 2-10 parts of an organic catalyst, (e) about 5-15 parts ammonium hydroxide, (f) about 15-30 parts urea, (g) about 2-10 parts ammonium chloride, (h) about 45-75 parts of an aqueous phosphoric acid solution and (i) about 2-10 parts ammonium formate, the aldehyde and urea being included in an approximately 1:1 weight ratio.

2. A fire retardant composition as defined by claim 1, wherein said aldehyde is selected from the group consisting of formaldehyde, acetaldehyde, paraldehyde and glyoxal.

3. A fire retardant composition as defined by claim 1, wherein said aqueous aldehyde solution comprises a 37% formaldehyde solution.

4. A fire retardant composition as defined by claim 1, wherein the alcohol solvent is selected from the group consisting of ethyl alcohol, isopropyl alcohol, methyl alcohol, glycols and mixtures thereof.

5. A fire retardant composition as defined by claim 4, wherein the alcohol solvent comprises a mixture of 25 to 35 parts ethyl alcohol and 2-10 parts ethylene glycol.

6. A fire retardant composition as defined by claim 1, wherein the alkanolamine is selected from the group consisting of mono-, di- and triethanolamine.

7. A fire retardant composition as defined by claim 1, further including 1-5 parts by weight of an additional fire retardant selected from the group consisting of oxides, hydroxides, nitrates, sulfates, phosphates and chlorides of aluminum, zinc, tin and antimony and ammonium salts.

8. A fire retardant composition as defined by claim 7, comprising the reaction product of 45-75 parts of a 37% aqueous formaldehyde solution, 25-35 parts of ethyl alcohol, 2-10 parts ethylene glycol, 5 to 20 parts triethanolamine, 2-10 parts p-toluene sulfonic acid, 5-15 parts ammonium hydroxide, 15-30 parts urea, 2-10 parts ammonium chloride, 45-75 parts of an 85% aqueous phosphoric acid solution, 2-10 parts ammonium formate, and 1-5 parts zinc nitrate.

9. A fire retardant composition as defined by claim 8, comprising the reaction product of 60 parts of a 37% aqueous formaldehyde solution, 30 parts ethyl alcohol, 5 parts ethylene glycol, 10 parts triethanolamine, 5 parts p-toluene sulfonic acid, 8 parts ammonium hydroxide, 22 parts urea, 6 parts ammonium chloride, 60 parts of an 85% aqueous phosphoric acid solution, 5 parts ammonium formate and 2 parts zinc nitrate.

10. A fire retardant composition as defined by claim 8, wherein the reaction product is formed by mixing the formaldehyde solution, ethylalcohol, ethylene glycol, triethanolamine, p-toluene sulfonic acid and ammonium hydroxide to form a solution having a pH of approximately 10-12, adding the urea, heating the mixture to at least about 150° F. for at least 10 minutes and then adding the remaining components to form a stable solution.

11. A method of making a fire retardant composition in a stable liquid form and including an approximately 1:1 weight ratio of aldehyde and urea, comprising the steps of
   (a) mixing 45 to 75 parts of an aqueous aldehyde solution with 20 to 40 parts of at least one alcohol solvent, 5 to 20 parts of an alkanolamine, 2 to 10 parts of an organic catalyst and 5 to 15 parts ammonium hydroxide to form a solution having a pH of approximately 10-12;
   (b) adding 15 to 30 parts urea to the solution, the urea and aldehyde being included in an approximately 1:1 weight ratio;
   (c) heating the mixture to at least about 150° F. for at least 10 minutes; and
   (d) adding to the mixture 2 to 10 parts ammonium chloride, 45 to 75 parts of an 85% aqueous phosphoric acid solution and 2 to 10 parts ammonium formate, all parts being by weight.

12. A method as defined by claim 11, wherein 1 to 5 parts of an additional fire retardant is added to the mixture after the mixture has been heated.

13. A method as defined by claim 12, wherein the ammonium chloride is added to the mixture while the mixture is at a temperature of at least about 150° F., the mixture is then cooled to a temperature of about 100° F. before the additional fire retardant is added, and the mixture is again cooled to a temperature of about 100° F. after the aqueous phosphoric acid solution is added and before the ammonium formate is added.

14. A method as defined by claim 13, wherein the fire retardant comprises zinc nitrate.

15. A fire retardant composition in a stable liquid solution form, comprising:
   (a) 5 to 90 parts by weight of the reaction product of, in parts by weight, about 45-75 parts of an aqueous aldehyde solution, about 25-45 parts of at least one alcohol solvent, about 5-20 parts of an alkanolamine, about 2-10 parts of an organic catalyst, about 5-15 parts ammonium hydroxide, about 15-30 parts urea, about 2-10 parts ammonium chloride, about 45-75 parts of an aqueous phosphoric acid solution and about 2-10 parts ammonium formate, the aldehyde and urea being included in an approximately 1:1 weight ratio; and
   (b) 10 to 95 parts by weight water.

16. A curable fire retardant composition, comprising (a) 70 to 95 parts by weight of the reaction product of, in parts by weight, about 45-75 parts of an aqueous aldehyde solution, about 25-45 parts of at least one alcohol solvent, about 5-20 parts of an alkanolamine, about 2-10 parts of an organic catalyst, about 5-15 parts ammonium hydroxide, about 15-30 parts urea, about 2-10 parts ammonium chloride, about 45-75 parts of an aqueous phosphoric acid solution and about 2-10 parts ammonium formate, the aldehyde and urea being included in an approximately 1:1 weight ratio; and
   (b) 5 to 30 parts by weight of a thermosetting resin.

17. A curable fire retardant composition as defined by claim 16, wherein the thermosetting resin is selected from the group consisting of melamine and phenolic resins.

18. A substrate having applied thereto a fire retardant composition comprising the reaction product of, in parts by weight, (a) about 45-75 parts of an aqueous aldehyde solution, (b) about 25-45 parts of at least one alcohol solvent, (c) about 5 to 20 parts of an alkanolamine, (d) about 2-10 parts of an organic catalyst, (e) about 5-15 parts ammonium hydroxide, (f) about 15-30 parts urea, (g) about 2-10 parts ammonium chloride, (h) about 45-75 parts of an aqueous phosphoric acid solution and (i) about 2-10 parts ammonium formate, the aldehyde and urea being included in an approximately 1:1 weight ratio.

19. A substrate as defined by claim 18, wherein said substrate is selected from the group consisting of wood, paper, particle board and natural and synthetic textiles.

* * * * *